United States Patent Office

3,502,688
Patented Mar. 24, 1970

3,502,688
5-(4-PYRIDYLETHYL)-PYRIDOINDOLE
DERIVATIVES
Leo Berger, Montclair, and Alfred John Corraz, Wayne,
N.J., assignors to Hoffmann-La Roche Inc., Nutley,
N.J., a corporation of New Jersey
No Drawing. Filed Sept. 10, 1968, Ser. No. 758,711
Int. Cl. C07d 31/36
U.S. Cl. 260—295                              20 Claims

ABSTRACT OF THE DISCLOSURE 5-(4-pyridylethyl)-pyridoindole derivatives having analgesic activity, prepared from the correspondingly substituted 4-piperidones and N-amino-N-arylaminoethylpyridines, are described.

BRIEF SUMMARY OF THE INVENTION

The invention relates to novel 5-(4-pyridylethyl)-pyridoindole derivatives, processes and intermediates for the preparation thereof. More particularly, the invention relates to compounds of the formula

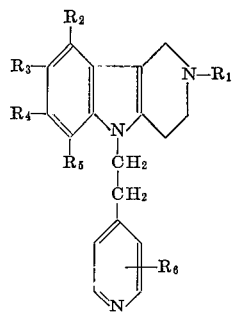

I wherein $R_1$ is hydrogen, methyl, ethyl, benzoyl or phenyl-lower alkyl; $R_2$, $R_3$, $R_4$ and $R_5$ are each independently hydrogen, halogen, lower alkyl, lower alkoxycarbonyl, carboxy, lower alkoxy, hydroxymethyl or trifluoromethyl; and $R_6$ is hydrogen or lower alkyl, and pharmaceutically acceptable acid addition salts thereof. The compounds of Formula I are useful as analgesic agents.

DETAILED DESCRIPTION

The end-products of the invention are characterized by the formula

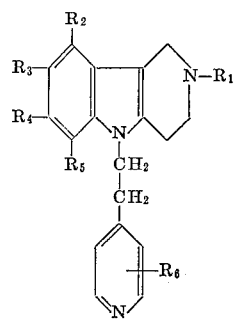

I wherein $R_1$ is hydrogen, methyl, ethyl, benzoyl or phenyl-lower alkyl; $R_2$, $R_3$, $R_4$ and $R_5$ are each independently hydrogen, halogen, lower alkyl, lower alkoxycarbonyl, carboxy, lower alkoxy, hydroxymethyl or trifluoromethyl; and $R_6$ is hydrogen or lower alkyl, and pharmaceutically acceptable acid addition salts thereof.

As used herein, the term "lower alkyl" is to be understood to mean a straight or branched chain alkyl group of 1 to 6 carbon atoms, such as methyl, ethyl, isopropyl, butyl, pentyl, hexyl, and the like; methyl is preferred. The term "halogen" is to be understood to mean all of the halogens, i.e., bromine, chlorine, fluorine and iodine; bromine and chlorine are preferred. The term "lower alkoxy" is to be understood to mean a lower alkyl ether group in which the lower alkyl moiety is as described above, such as methoxy, ethoxy, propoxy, butoxy and the like; methoxy is preferred.

Illustrative of the compounds of Formula I are the following:

7-chloro-1,3,4,5-tetrahydro-2-methyl-5-[2-(4-pyridyl)
  ethyl]-2H-pyrido[4,3-b]indole
1,3,4,5-tetrahydro-2,8,9-trimethyl-5-[2-(4-pyridyl)
  ethyl]-2H-pyrido[4,3-b]indole
1,3,4,5-tetrahydro-2,7,8-trimethyl-5-[2-(4-pyridyl)
  ethyl]-2H-pyrido[4,3-b]indole
1,3,4,5-tetrahydro-2,7-dimethyl-5-[2-(4-pyridyl)ethyl]-
  2H-pyrido[4,3-b]indole
1,3,4,5-tetrahydro-8-methoxy-2-methyl-5-[2-(4-pyridyl)
  ethyl-2H-pyrido[4,3-b]indole
8-chloro-1,3,4,5-tetrahydro-2-methyl-5-[2-(4-pyridyl)
  ethyl]-2H-pyrido[4,3-b]indole
1,3,4,5-tetrahydro-2-methyl-5-[2-(4-pyridyl)ethyl]-2H-
  pyrido[4,3-b]indole
1,3,4,5-tetrahydro-2,8-dimethyl-5-[2-(4-pyridyl)ethyl]-
  2H-pyrido[4,3-b]indole
8-trifluoromethyl-1,3,4,5-tetrahydro-2-methyl-5-[2-(4-
  pyridyl)ethyl]-2H-pyrido[4,3-b]indole
1,3,4,5-tetrahydro-2,6-dimethyl-5-[2-(4-pyridyl)ethyl]-
  2H-pyrido[4,3-b]indole
1,3,4,5-tetrahydro-2-methyl-5-[2-(4-pyridyl)ethyl]-2H-
  pyrido[4,3-b]indole-8-carboxylic acid ethyl ester
1,3,4,5-tetrahydro-2-methyl-5-[2-(4-pyridyl)ethyl]2-H-
  pyrido[4,3-b]indole-8-carboxylic acid
1,3,4,5-tetrahydro-8-hydroxymethyl-2-methyl-5-[2-(4-
  pyridyl)-ethyl]-2H-pyrido[4,3-b]indole
8-chloro-1,3,4,5-tetrahydro-5-[2-(4-pyridyl)ethyl]-2H-
  pyrido[4,3-b]indole
2-benzoyl-8-chloro-1,3,4,5-tetrahydro-5-[2-(4-pyridyl)
  ethyl]-2H-pyrido[4,3-b]indole
8-chloro-1,3,4,5-tetrahydro-2(2-phenethyl)-5-[2-(4-
  pyridyl)ethyl]-2H-pyrido[4,3-b]indole.

The compounds of Formula I, wherein $R_2$, $R_3$, $R_4$ and $R_5$ are each independently other than carboxy or hydroxymethyl, can be prepared according to the procedure set forth in Reaction Scheme I:

SCHEME I

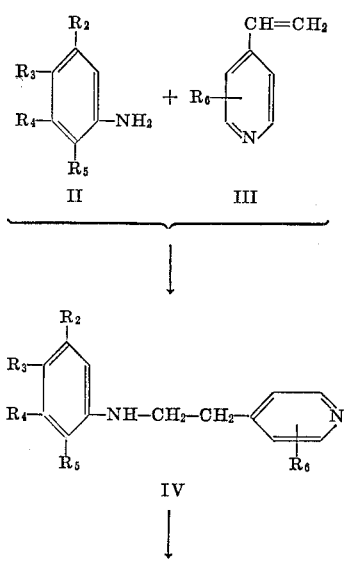

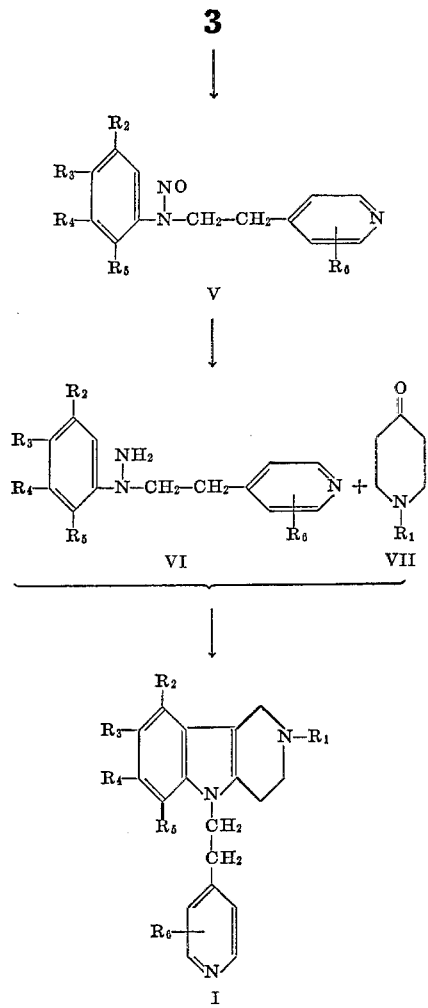

wherein $R_1$, $R_2$, $R_3$, $R_4$, $R_5$ and $R_6$ are as hereinbefore described.

In the method of preparation as outlined above, the novel end-products of Formula I are prepared by the condensation of an N-amino-N-arylaminoethylpyridine of Formula VI with a piperidone of Formula VII, which are known compounds or are analogs of known compounds readily obtained by known procedures. The condensation is suitably carried out in the presence of an inert organic solvent such as, for example, benzene and the like. The ratio of reactants employed in the condensation is not critical though, for practical purposes, it is preferred to utilize the piperidone in excess. The condensation is suitably carried out at an elevated temperature suitably at a temperature between about room temperature and the boiling point of the reaction mixture though higher or lower temperatures could also be utilized, the preferred temperature range being between about 20° C. and about 150° C.

The N-amino-N-arylaminoethylpyridine intermediates of Formula VI wherein at least one of $R_2$, $R_3$, $R_4$ or $R_5$ is other than hydrogen are also novel compounds and thus constitute a part of this invention. They are prepared by reduction of the corresponding N-nitrosoamine of Formula V. The reduction can be effected by any of the usual techniques for reducing nitroso compounds to amines preferably by the use of a mild reducing agent such as zinc. The reduction is suitably carried out in the presence of an aqueous acid at a temperature below room temperature, preferably between about 0° and 20°.

The N-nitrosoamines of Formula V wherein at least one of $R_2$, $R_3$ $R_4$ or $R_5$ is other than hydrogen are also novel compounds which constitute part of this invention. They are prepared by nitrosation of the corresponding arylaminoethylpyridine derivatives of Formula IV. The nitrosation is suitably effected by treating a compound of Formula IV with nitrous acid which can be conveniently prepared in situ from hydrochloric acid and sodium nitrite. The reaction is suitably carried out in the presence of an inert organic solvent such as a lower alkanol and preferably at a low temperature, i.e., a temperature between about 25° and about 0° C.

The intermediates of Formula IV wherein at least one of $R_2$, $R_3$, $R_4$ and $R_5$ is other than hydrogen are also novel compounds which constitute a part of this invention. They are prepared by the condensation of an aniline derivative of Formula II, which are known compounds or are analogs of known compounds readily obtained by known procedures, and a vinylpyridine of Formula III which are also known compounds or are analogs of known compounds readily obtained by known procedures. The condensation is carried out under anhydrous conditions employing acids such as acetic acid and the like or sodium as the condensing agent. The condensation reaction can be carried out in the absence of solvent or if desired there can be used any anhydrous inert organic solvent. The reaction is suitably effected at an elevated temperature, e.g., between about room temperature, i.e., about 20° C. and about 100° C., though higher or lower temperatures can be used.

The compounds of Formula I, wherein one or more of $R_2$, $R_3$, $R_4$ and $R_5$ is hydroxymethyl, can be prepared by treating the respective compound of Formula I, wherein correspondingly one or more of $R_2$, $R_3$, $R_4$ and $R_5$ is methoxycarbonyl, with a reducing agent such as, for example, lithium aluminum hydride and the like.

The compounds of Formula I, wherein one or more $R_2$, $R_3$, $R_4$ and $R_5$ is carboxy, can be prepared by treating the respective compound of Formula I, wherein correspondingly one or more of $R_2$, $R_3$, $R_4$ and $R_5$ is methoxycarbonyl, with a hydrolyzing agent such as, for example, sodium hydroxide and the like.

Preferred end-products of the invention are characterized by the formula

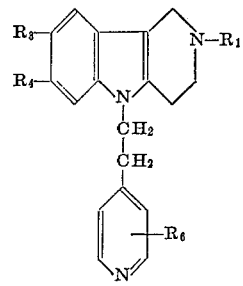

wherein $R_1$ is hydrogen, methyl, ethyl, benzoyl or phenyl-lower alkyl; $R_3$ and $R_4$ are each independently hydrogen, halogen, lower alkyl, lower alkoxycarbonyl, carboxy, lower alkoxy, hydroxymethyl or trifluoromethyl; and $R_6$ is hydrogen or lower alkyl, and their pharmaceutically acceptable acid addition salts. Of these, the more preferred are those wherein $R_1$ is hydrogen or methyl, $R_3$ and $R_4$ are chloro, bromo or methyl, and $R_5$ is hydrogen and the most preferred are those wherein $R_1$ is hydrogen or methyl, $R_3$ is chloro, bromo or methyl, and $R_4$ and $R_6$ are hydrogen.

The compounds of Formula I form acid addition salts and such salts are also within the scope of the invention. The compounds of Formula I form pharmaceutically acceptable acid addition salts with both pharmaceutically acceptable organic and inorganic acids. Suitable organic acids are, for example, maleic acid, fumaric acid, ascorbic acid, tartaric acid, salicylic acid, succinic acid, citric acid and the like. Suitable inorganic acids are, for example, the hydrohalic acids, e.g., hydrochloric acid and hydrobromic acid, sulfuric acid, sulfamic acid, phosphoric acid and the like. The acid addition salts are readily obtainable by the usual techniques for the preparation of salts from acids.

The compounds of Formula I of the present invention can be formulated, using conventional inert pharmaceutical adjuvant materials, into dosage forms which are suitable for oral or parenteral administration. Such dosage forms include tablets, suspensions, solutions, etc. Furthermore, the compounds of this invention can be embodied into, and administered in the form of, suitable hard or soft capsules The identity of the inert adjuvant materials which are used in formulating the present compounds into oral and parenteral dosage forms will be immediately apparent to persons skilled in the art. These adjuvant materials, either inorganic or organic in nature, include, for example, water, gelatin, lactose, starch, magnesium stearate, talc, vegetable oils, gums, polyalkylene glycols, etc. Moreover, preservatives, stabilizer, wetting agents, emulsifying agents, salts for altering osmotic pressure, buffers, etc., can be incorporated, if desired, into such formulations.

The compounds of Formula I and their pharmaceutically acceptable acid addition salts are distinguishable by their analgesic activity, and therefore are useful analgesic agents. Particularly pronounced is the analgesic activity of the 8-chloro - 1,3,4,5-tetrahydro-2-methyl - 5[2-(4-pyridyl)ethyl]2H-pyrido[4,3-b-]indole dihydrochloride dihydrate.

The useful analgesic activity of the compounds of Formula I is demonstrated in warm-blooded animals utilizing the standard procedures. For example, groups comprised of 7 mice each are administered the test substance in variable amounts subcutaneously or orally. One untreated group is used as a control. Fifteen minutes after the injection of the test drug, 2 mg./kg. of 2-phenyl-1,4-benzoquinone are injected intraperitoneally into all groups. Ten minutes after administration of the 2-phenyl-1,4-benzoquinone, the number of writhes per animal are counted for a 5-minute period. The percent reduction of writhing is calculated from a comparison of treated control groups. The $ED_{50}$ is calculated according to the method of Litchfield, Jr. and Wilcoxon (J. Pharm. & Exp. Therap., 96, No. 2, June 1949).

When the compound 8-chloro-1,3,4,5-tetrahydro-2-methyl - 5[2 - 4 - pyridyl)ethyl] - 2H - pyrido[4,3-b]indole dihydrochloride dihydrate, which has an $LD_{50}$ of 220 mg./kg. p.o., is utilized orally as the test substance it demonstrates and $ED_{50}$ of 37.7.

Another procedure comprises the rat-tail flick test. Mice are placed in containers with tails protruding. The containers are provided with holes for ventilation and a small cutout for making subcutaneous injections. A light source is directly focused by means of a parabolic reflector exactly on the tail when the cage is in position. A shutter system for stopping the light rays and a stop watch for recording reaction time are operated simultaneously by a foot switch. The intensity of the heat is adjusted by means of a powerstat so that untreated mice respond in 4 seconds. The end point response is a sudden typical twitch of the tail. Control reaction time is measured in duplicate in each of five mice. Following drug administration, duplicate determinations are again made 15, 30, 45, 60, 90 and 120 minutes (or until a fresh reaction time is reached). The analgesic dose, the $ED_{50}$ in mg./kg., is defined as the dose causing a 50 percent elevation in reaction time at peak effect.

When 8 - chloro -1,3,4,5 - tetrahydro - 2 - methyl - 5 [2 - 4 - pyridyl)ethyl] - 2H - pyrido[4,3-b]indole dihydrochloride dihydrate, which has an $LD_{50}$ of 220 mg./kg. p.o., is utilized as the test substance orally, it demonstrates an $ED_{50}$ of 47 and when utilized subcutaneously it demonstrates an $ED_{50}$ of 24.

The compounds of the Formula I and their pharmaceutically acceptable acid addition salts have effect qualitatively similar to those of propoxyphene, known for its therapeutic use and properties. Thus, the compounds of the Formula I demonstrate a pattern of activity associated with analgesics of known efficacy and safety.

The percentage of active ingredient in the compositions of the invention may be varied, it being necessary that it should constitute a proportion such that a suitable dosage for the therapeutic effect desired in the species of animal shall be obtained. Obviously several unit dosage forms may be administered at about the same time.

The following nonlimiting examples further illustrate the invention. All parts are by weight and all temperatures are in degrees centigrade, unless otherwise mentioned.

Example 1

Preparation of 4-[2-(3-chlorophenylamino)ethyl]pyridine.—A stirred mixture of 30 g. of m-chloroaniline, 100 ml. of methanol, 25 g. 4-vinylpyridine and 14 g. glacial acetic acid was heated to reflux. After refluxing for 8 hours, the reaction mixture was cooled and made alkaline with 3 N sodium hydroxide. The alkaline mixture was steam distilled for 7 hours and after the pot residue had been cooled by the addition of 200 g. of ice, it was extracted with ether (3× 200 ml.). The ether solution was washed by extraction with water (4× 100 ml.) and dried over anhydrous sodium sulfate. Following filtration of the desiccant and evaporation of the ether, 69.1 g. of a light yellow oil was obtained.

Preparation of 4-[2-(3-chloro-N-nitrosophenylamino)ethyl]pyridine.—To a stirred solution of 69 g. of 4-[2-(3-chlorophenylamino)ethyl]pyridine, 310 ml. of 1 N hydrochloric acid and 300 ml. of ethanol was added dropwise 22 g. of sodium nitrite dissolved in 100 ml. of water. During the addition, the temperature was held between 4° to 8° by means of an ice bath. After the addition was complete, the mixture was stirred for 2 hours near 0°, then filtered and dried: yield 47.4 g., melting point 93–94°.

Preparation of 4 - [2 - (N-amino-3-chlorophenylamino) ethyl]pyridine.—Over the course of 1.5 hours, 25 g. of zinc dust was added in small portions to vigorously stirred mixture of 20 g. of 4-[2-(3-chloro-N-nitrosophenylamino) ethyl]pyridine, 80 ml. of acetic acid and 20 ml. of water. During the addition, the temperature of the reaction mixture held between 0–5° with an ice-salt bath. Following the addition of the zinc dust, the mixture was stirred for 2 hours near 0° and then 1 hour between 35–40°. Water (200 ml.) was added and the mixture was filtered. The filter cake was washed with water (4× 50 ml.).

Ice (300 g.) was added to the combined washings and filtrate and the mixture was made strongly alkaline with 6 N sodium hydroxide. The alkaline mixture was extracted with ether (3× 200 ml.) and the ether extract was washed by extraction with water (5× 100 ml.). After the ether solution had dried over sodium sulfate, it was filtered and the ether was distilled from the solution yielding 15.9 g. of product.

Preparation of 7 - chloro-1,3,4,5-tetrahydro-2-methyl-5-[2 - (4 - pyridyl)ethyl] - 2H-pyrido[4,3-b]indole dihydrochloride monohydrate.—A stirred mixture of 15 g. of 4-[2-(N-amino-3-chlorophenylamino)ethyl]pyridine, 80 ml. of benzene and 17 g. of 1-methylpiperidone-4 was heated to reflux. After 7 hours under reflux, 1.1 ml. of water had been removed from the reaction with a Dean-Stark water trap and the reaction mixture was concentrated under reduced pressure in a water bath. To the stirred residue 80 ml. of 6.1 N alcoholic hydrogen chloride was added in small portion (5 ml.). After the addition was completed, the reaction mixture was stirred under reflux for 4 hours, cooled to room temperature and poured onto ice (300 g.). Sodium hydroxide (6 N) was added to the mixture until the pH was 10 and the alkaline mixture was extracted with ether (3× 300 ml.). The ether solution was washed by extraction with water (4× 200 ml.) and dried over anhydrous sodium sulfate. Following filtration of the desiccant and evaporation of the ether solution to dryness, the residue was crystallized from acetone, yielding 9.8 g., melting point 121–122°.

$UV\ \lambda_{max.}^{isopropanol}\ 234\ m\mu,\ \epsilon\ 39{,}400$

*Analysis.*—Calc'd for $C_{19}H_{20}ClN_3$ (MW 325.83), percent: C, 70.04; H, 6.19; N, 12.91. Found (percent): C, 70.02; H, 6.38; N, 12.95.

The base (9.0 g.) was dissolved in ethanol and a slight excess of alcoholic hydrogen chloride was added, followed by several volumes of ether. After filtering and drying, 9.7 g. of salt was obtained, melting point 260°–262°.

The salt was recrystallized from ethanol and then humidified (desiccator saturated with water vapor) and dried; yield 6.5 g., melting point 254–256°.

*Analysis.*—Calc'd for $C_{19}H_{20}ClN_3 \cdot 2HCl \cdot H_2O$ (MW 416.78), percent: C, 54.75; H, 5.80; N, 10.08. Found (percent): C, 54.98; H, 6.07; N, 10.33.

Example 2

Preparation of 4-[2-(3,4 - dimethylphenylamino)ethyl]pyridine.—A stirred mixture of 30.3 g. of 3,4-dimethylaniline, 26.2 g. of 4-vinylpyridine and 100 ml. of methanol was heated to reflux. After 7 hours under reflux, the pH was adjusted to 10 with 6 N sodium hydroxide and the mixture was steam distilled for 7 hours. When the pot residue had cooled (ice was added) it was extracted with ether (3× 300 ml.). The ether extract was washed by extraction with water (4× 200 ml.) and dried over anhydrous sodium sulfate. Following filtration of the desiccant, the ether was removed under reduced pressure in a water bath and 42.5 g., melting point 62–68° was obtained.

Preparation of 4 - [2 - (3,4 - dimethyl-N-nitrosophenylamino)ethyl]pyridine.—A solution of 14.5 g. of sodium nitrite in 150 ml. of water was added dropwise over the course of 1 hour to a stirred solution of 42.5 g. of 4-[2-(3,4 - dimethylphenylamino)ethyl]pyridine, 200 ml. of ethanol and 200 ml. of 1 N hydrochloric acid. During the addition, the temperature of the reaction mixture was held near 10° by means of an ice-bath. After the addition, the temperature was allowed to rise to room temperature with stirring. The reaction mixture was kept at room temperature overnight. Following filtration and air drying, 45.5 g. of a light yellow precipitate was obtained, melting point 71–74°.

Preparation of 4-[2-(N-amino-3,4-dimethylphenylamino)ethyl]pyridine.—Over the course of 1.5 hours, 55 g. of zinc dust was added in small portion to a vigorously stirred mixture of 45.5 g. of 4-[2-(3,4-dimethyl-N-nitrosophenylamino)ethyl]pyridine, 220 ml. of acetic acid and 55 ml. of water. During the addition, the temperature of the reaction was held between 0–5° with an ice-salt bath. Following the addition, the mixture was stirred for 2 hours between 0–5° C. and then for 1 hour at 40°. Water (500 ml.) was added and the mixture was filtered. The filter cake was washed with water (4× 50 ml.). Ice (500 g.) was added to the combined filtrate and washings and 6 N sodium hydroxide was added until the pH became 10. The alkaline mixture was extracted with ether (3× 200 ml.) and the ether extract was washed by extraction with water (4× 100 ml.). After the ether solution had dried over anhydrous sodium sulfate, it was filtered and the ether was distilled from the solution yielding 38.1 g. of the hydrazine compound.

Preparation of 1,3,4,5 - tetrahydro-2,8,9-trimethyl-5-[2-(4-pyridyl)ethyl]-2H-pyrido[4,3-b]indole dihydrochloride monohydrate.—A stirred solution of 30 g. of 4-[2-(N-amino-3,4-dimethylphenylamino)ethyl]pyridine, 150 ml. of benzene and 30 g. 1-methylpiperidone-4 was heated to reflux. After 18 hours under reflux, 1.7 ml. of water had been removed from the reaction by means of a Dean-Stark water trap and the reaction mixture was concentrated under reduced pressure in a water bath. To the stirred residue, 150 ml. of 6.8 N alcoholic hydrogen chloride was added in small portions and after the addition was completed, the reaction mixture was stirred under reflux for 2 hours, cooled to room temperature and poured onto ice (400 g.). Sodium hydroxide (6 N) was added until the pH of the mixture was 10. The alkaline mixture was extracted with ether (3× 300 ml.) and the ether extract was washed by extraction with water (5× 100 ml.). When the ether solution was dried over anhydrous sodium sulfate, a heavy precipitate formed which was filtered. The precipitate was partitioned between chloroform and water. The chloroform layer was drawn off and washed several times with water and dried over anhydrous sodium sulfate. Following filtration of the desiccant and evaporation of the chloroform, the residue was crystallized from acetone; yield 3.6 g., melting point 128–129°, $\lambda_{max.}^{isopropanol}\ 231\ m\mu$ The base so obtained (3.3 g.) was dissolved in methanol and a slight excess of alcoholic hydrogen chloride was added, followed by several volumes of ethyl acetate. The precipitate was filtered and dried; yield 2.7 g., melting point 204–205°.

*Analysis.*—Calc'd for $C_{21}H_{25}N_3 \cdot 2HCl \cdot H_2O$ (M.W. 410.38) percent: C, 61.46; H, 7.12. Found (percent): C, 61.48; H, 7.14.

Preparation of 1,3,4,5-tetrahydro-2,7,8-trimethyl-5-[2-(4-pyridyl)ethyl]-2H-pyrido[4,3-b]indole dihydrochloride monohydrate.—After drying over anhydrous sodium sulfate, the ether soluble portion from the preparation of 1,3,4,5 - tetrahydro - 2,8,9 - trimethyl - 5 - [2 - (4 - pyridyl)ethyl]-2H-pyrido[4,3-b]indole was filtered and concentrated to dryness under reduced pressure, yield 15.9 g. The viscous residue was crystallized from hexane, yield 11.5 g., melting point 106–114°. Following recrystallization from ethyl acetate, 7.1 g. of product was obtained, melting point 118–119° (uncorr.).

$UV\ \lambda_{max.}^{isopropanol}\ 231\ m\mu$

*Analysis.*—Calc'd for $C_{21}H_{25}N_3$ (M.W. 319.43) percent: C, 78.96; H, 7.89; N, 13.16. Found (percent): C, 78.97; H, 8.15; N, 13.00.

The base (6.9 g.) was dissolved in methanol and a slight excess of alcoholic hydrogen chloride was added followed by several volumes of ethyl acetate. After the precipitate was filtered and dried, 7.7 g. was obtained, melting point 252–253°. The salt was humidified (desiccator saturated with water vapor) and redried, yield 7.5 g., melting point 246–247°.

*Analysis.*—Calc'd for $C_{21}H_{25}N_3 \cdot 2HCl \cdot H_2O$ (M.W. 410.38) percent: C, 61.46; H, 7.12; N, 10.24. Found (percent): C, 61.66; H, 7.08; N, 10.29.

Example 3

Preparation of 4-[2-(3-methylphenylamino)ethyl]pyridine.—A stirred mixture of 30 g. m-toluidine, 100 ml. of methanol, 30 g. 4-vinylpyridine and 14 g. of glacial acetic acid was heated to reflux. After 7 hours under reflux, the reaction was cooled and 6 N sodium hydroxide was added until the pH was 10. The mixture was steam distilled for 7 hours, cooled to room temperature and extracted with ether (4× 200 ml.). After the ether extract had been washed by extraction with water (4× 100 ml.), the solution was dried over anhydrous sodium sulfate. Following filtration of the desiccant and evaporation of the ether, 51.2 g. of viscous liquid was obtained.

Preparation of 4-[2-(N-nitroso-3-methylphenylamino)ethyl]pyridine.—A solution of 18 g. of sodium nitrite in 180 ml. of water was added dropwise over the course of 1.5 hours to a cooled (5°, ice bath) stirred solution of 51.2 g. of 4-[2-(3-methylphenylamino)ethyl]pyridine, 250 ml. of 1 N hydrochloric acid and 200 ml. of ethanol. During the addition, the temperature was maintained near 10° by an ice bath. After the addition, the reaction mixture was stirred for 1.5 hours between 0–5°, set overnight at room temperature and then extracted with ether (3× 200 ml.). The ether solution was dried over sodium sulfate, filtered and evaporated to dryness, yielding 51.8 g.

Preparation of 4-[2-(N-amino-3-methylphenylamino) ethyl]pyridine.—Over the course of 2 hours, 60 g. of zinc dust was added in small portions to a cold, stirred mixture of 52 g. 4-[2-(N-nitroso-3-methylphenylamino) ethyl]pyridine, 208 ml. of glacial acetic acid and 52 ml. of water. During the addition, the temperature was held near 5° with an ice-salt bath. Following the addition, the mixture was stirred at 3° to 10° for 1 hour, then stirred 1.5 hours between 30–38°. Water (600 ml.) was added to the reaction mixture and the mixture was filtered. The filter cake was washed with water (4× 50 ml.). Ice (400 g.) was added to the combined filtrate and washings and the pH was made greater than 10 with 6 N sodium hydroxide. The alkaline mixture was extracted with ether and the ether extract was washed by extraction with water. After the ether solution had dried over anhydrous sodium sulfate, the desiccant was filtered off and the ether was evaporated at reduced pressure, yielding 38.7 g. of viscous liquid.

Preparation of 1,3,4,5-tetrahydro-2,7-dimethyl-5-[2-(4-pyridyl)ethyl] - 2H - pyrido[4,3-b]indole dihydrochloride.—A stirred mixture of 15 g. of 4-[2-(N-amino-3-methylphenylamino)ethyl]pyridine, 12 g. 1-methylpiperidone-4 and 50 ml. of benzene was heated to reflux. After 18 hours under reflux, 0.8 ml. of water had been removed from the reaction by the use of a Dean-Stark trap and the mixture was concentrated under reduced pressure. To the stirred residue 50 ml. of 6.8 N alcoholic hydrogen chloride was added portionwise. After the addition was completed, the reaction mixture was refluxed for 1 hour, poured onto ice and made alkaline with 6 N sodium hydroxide. The alkaline mixture was extracted with ether and the ether extract was washed by extraction with water. After the ether solution had dried over anhydrous sodium sulfate, the desiccant was filtered off and the ether was evaporated. The residue was distilled at reduced pressure yielding 11.1 g., boiling point 206–210° at 0.07 mm.;

$\lambda_{max.}^{isopropanol}$ 229–230 m$\mu$, $\epsilon$ 35,200

The base (10.2 g.) was dissolved in ethanol and a slight excess of alcoholic hydrogen chloride was added, followed by several volumes of ether; yield 12.4 g. Following recrystallization from a mixture of methanol and ethyl acetate, 7.1 g., melting point 248–250° was obtained.

Analysis.—Calc'd for $C_{20}H_{23}N_3 \cdot 2HCl \cdot 0.5\ CH_3OH$ (M.W. 394.35), percent: C, 62.43; H, 6.90; N, 10.66. Found (percent): C, 62.39; H, 7.21; N, 11.13.

Example 4

Preparation of 4-[2-(4-methoxyphenylamino)ethyl]pyridine.—A stirred solution of 50 g. of p-anisidine, 42 g. 4-vinyl pyridine, 200 ml. methanol and 23 g. of glacial acetic acid was heated to reflux. After 11 hours at reflux, the reaction mixture was concentrated under reduced pressure (temperature less than 60°) and the residue was partitioned between ether (500 ml.) and water (200 ml.). The aqueous layer was discarded and the organic layer was extracted with 1 N sodium hydroxide (500 ml.), then extracted with water (4× 200 ml.) and dried over anhydrous sodium sulfate. Following filtration and evaporation of the ether solution, the residue was distilled in vacuum; yield 65.0 g., boiling point 172–176° at 0.45 mm.

Preparation of 4-[2-(N-nitroso-4-methoxyphenylamino) ethyl]pyridine.—A solution of 25 g. of sodium nitrite in 100 ml. of water was added dropwise to a stirred solution of 73.6 g. of 4-[2-(4-methoxyphenylamino)ethyl] pyridine in 330 ml. of 1 N hydrochloric acid and 300 ml. of ethanol. The temperature during the addition was held between 5–10° by the use of an ice water bath. After the addition, the reaction was stirred for 1.5 hours with the temperature near 10° and then allowed to warm slowly to room temperature with stirring. The heavy precipitate that formed was filtered and air dried yielding 69.7 g., melting point 72–73°.

Preparation of 4-[2-(N-amino-4-methoxyphenylamino)- ethyl]pyridine.—Over the course of 1.5 hours, 130 g. of zinc dust was added in small portions to a vigorously stirred mixture of 69 g. of 4-[2-(N-nitroso-4-methoxyphenylamino)ethyl]pyridine in 280 ml. of glacial acetic acid and 80 ml. of water. During the addition, the temperature of the reaction was held between 0–5° with an ice-salt bath. Following the addition, the mixture was stirred for 2 hours between 0–5° C. and then 1 hour at 40°. Water (500 ml.) was added and the mixture was filtered. The filter cake was washed with water (4× 100 ml.). Ice (500 g.) was added to the combined filtrate and washings and the mixture was made strongly alkaline with 6 N sodium hydroxide. The alkaline mixture was extracted with ether (3× 300 ml.) and the ether solution was washed by extraction with water (5× 200 ml.) until neutral. After the ether solution had dried over anhydrous sodium sulfate, it was filtered and the ether was distilled from the solution yielding 32.1 g. of the hydrazine compound.

Preparation of 1,3,4,5-tetrahydro-8-methoxy-2-methyl-5-[2-(4-pyridyl)ethyl]-2H-pyrido[4,3-b]indole dihydrochloride.—A stirred mixture of 10 g. of 4-[2-(N-amino-4-methoxyphenylamino)ethyl]pyridine, 6.0 g. of 1-methylpiperidone-4 and 50 ml. benzene was heated to reflux. After 6 hours under reflux, 0.7 ml. of water had been removed from the reaction mixture with a Dean-Stark water trap and the reaction mixture was concentrated under reduced pressure in a water bath. To the stirred residue 60 ml. of 7 N alcoholic hydrogen chloride was added in small portions (5 ml.). After the addition was complete, the reaction mixture was refluxed and stirred an additional 0.5 hour, allowed to cool and poured onto ice (200 g.). The mixture was made strongly alkaline with 6 N sodium hydroxide and extracted with ether (2× 200 ml.). The ether extract was washed by extraction with water (4× 100 ml.) and dried over anhydrous sodium sulfate. Following filtration of the desiccant and evaporation of the ether, the residue was crystallized from ethyl acetate to yield 3.2 g., melting point 87–88°;

$\lambda_{max.}^{isopropanol}$ 228 m$\mu$

The base (3.1 g.) was dissolved in ethanol (20 ml.) and a slight excess (2.2 mole) of 7 N alcoholic hydrogen chloride was added followed by 3 volumes of ether. The precipitate obtained was filtered and dried; yield 4.3 g., melting point 179–183°. Following recrystallization from a mixture of ethyl acetate and methanol, 3.4 g., melting point 183–184° was obtained.

Analysis.—Calc'd for $C_{22}H_{23}N_3O \cdot 2HCl$ (M.W. 394.33), percent: C, 60.91; H, 6.39; N, 10.66. Found (percent): C, 60.71; H, 6.57; N, 10.51.

Example 5

Preparation of 4-[2-(4-chlorophenylamino)ethyl]pyridine.—A mixture of 30 g. p-chloroaniline, 25 g. of 4-vinylpyridine, 14 g. glacial acetic acid and 100 ml. of methanol was stirred at reflux temperature. After 8 hours at reflux, the methanol was distilled from the reaction mixture at reduced pressure and the residue was suspended in 300 ml. of water containing 100 g. of ice. The pH was adjusted to approximately 11 with 6 N sodium hydroxide and the alkaline mixture was extracted with ether (3× 200 ml.). The ether extract was in turn washed by extraction with water (5× 100 ml. and dried over anhydrous sodium sulfate. Following filtration of the desiccant and evaporation of the ether under reduced pressure, the residue was distilled in high vacuum yielding 39.9 g., boiling point 174–185° at 0.03 mm., melting point 76–77°.

Analysis.—Calc'd for $C_{13}H_{13}ClN_2$ (M.W. 232.71), percent: C, 67.09; H, 5.63; N, 12.04. Found (percent) C, 66.83; H, 5.79; N, 11.98.

The base (36.25) was dissolved in methanol and a slight excess (2.2 moles) of alcoholic hydrogen chloride was added followed by several volumes of ethyl acetate. The precipitate obtained was filtered and dried yielding 34.1 g., melting point 155–157°.

*Analysis.*—Calc'd for $C_{13}H_{13}ClN_2 \cdot 2HCl$ (M.W. 305.64), percent: C, 51.08; H, 4.95; N, 9.17. Found (percent): C, 50.80; H, 4.72; N, 9.05.

Preparation of 4-[2-(4-chloro-N-nitrosophenylamino)-ethyl]pyridine.—A solution of 12.0 g. of sodium nitrite in 60 ml. of water was added dropwise over the course of 1 hour to a stirred solution of 26.6 g. of 4-[2-(4-chlorophenylamino)ethyl]pyridine dihydrochloride, 100 ml. of water and 100 ml. of ethanol. During the addition, the temperature was held near 10° C. with an ice bath. After the addition, the temperature of the stirred reaction mixture was allowed to rise slowly (3 hours) to room temperature. Following filtration and drying, 21.2 g., melting point 118–120° was obtained.

Preparation of 4-[2-(N-amino-4 - chlorophenylamino) ethyl]pyridine.—Over the course of 1.5 hours, 25 g. of zinc dust was added portionwise to a stirred solution of 21 g. of 4-[2 - (4 - chloro-N-nitrosophenylamino)ethyl] pyridine in 80 ml. of glacial acetic acid and 20 ml. of water. During the addition of the zinc, the temperature of the reaction mixture was held between 0° to +5° by means of an ice-salt bath. After the addition, the mixture was stirred for 1 hour at 10° and then for 1 hour at 40°. Water (200 ml.) was added and the mixture was filtered. The filter cake was washed several times with water. The filtrate and washings were combined. Ice was added (400 g.) and the mixture was made strongly alkaline with 6 N sodium hydroxide. The alkaline mixture was extracted with ether (3× 300 ml.) and the ether extract was washed by extraction with water (4× 200 ml.). When the ether solution had dried over anhydrous sodium sulfate, the desiccant was filtered off. The ether solution was then concentrated to dryness to yield 16.4 g. of product.

Preparation of 8-chloro-1,3,4,5-tetrahydro-2-methyl-5-[2-(4-pyridyl)ethyl] - 2H - pyrido[4,3-b]indole dihydrochloride dihydrate.—A stirred mixture of 10 g. of 4-[2-(N-amino-4-chlorophenylamino)ethyl]pyridine, 6 g. of 1-methyl-piperidone-4 and 75 ml. of benzene was heated to reflux. After 18 hours under reflux, 0.5 ml. of water had been removed from the reaction mixture by means of a Dean-Stark trap and the reaction mixture was concentrated under reduced pressure. To the stirred residue, 50 ml. of 5.5 N alcohol hydrogen chloride was added in small portion (5 ml.). After the addition was complete, the reaction mixture was refluxed and stirred an additional 0.5 hour, allowed to cool and poured onto ice (200 g.). Sodium hydroxide (6 N) was added until the pH was greater than 10 and the alkaline mixture was extracted with ether (3× 200 ml.). When the ether extract was washed by extraction with water (3× 200 ml.), a precipitate started to form. The mixture was placed in an ice bath for 4 hours and the insoluble portion was filtered. The filter cake was washed with water (4× 50 ml.) and dried; yield 4.5 g., melting point 163–164°. A small portion was recrystallized from a mixture of methylene chloride and ether and the melting point remained at 163–164°.

$$UV\ \lambda_{max.}^{isopropanol}\ 234\ m\mu$$

*Analysis.*—Calc'd for $C_{19}H_{20}ClN_3$ (M.W. 325.5), percent: C, 70.03; H, 6.19; N, 12.90. Found (percent): C, 70.20; H, 6.14; N, 12.61.

The base (4.2 g.) was dissolved in 20 ml. of warm ethanol and a slight excess (2.2 moles) of 5.5 N alcoholic hydrogen chloride was added, followed by several volumes of ether. Following filtration and drying, 4.7 g. of the salt was obtained which upon recrystallization from a mixture of ethyl acetate and methanol yielded 3.4 g., melting point 187–189°. A sample of the salt was humidified (in a desiccator saturated with water vapor) and redried; melting point 202–204° (dec.).

*Analysis.*—Calc'd for $C_{19}H_{20}ClN_3 \cdot 2HCl \cdot 2H_2O$ (M.W. 434.79), percent: C, 52.48; H, 6.03; N, 9.66. Found (percent): C, 52.55; H, 6.13; N, 9.53.

Example 6

Preparation of 4-[2-(phenylamino)ethyl]pyridine.—A solution of 46.5 g. aniline, 60 g. 4-vinylpyridine, 250 ml. of methanol and 30 ml. of glacial acetic acid was refluxed for 8 hours. The reaction mixture was then concentrated under reduced pressure in a water bath and the residue was partitioned between ether (600 ml.) and 2 percent sodium carbonate solution (200 ml.). The organic layer was separated and washed by extraction with 2 percent sodium carbonate solution (100 ml.) and then water (3× 200 ml.). After the ether solution had dried over anhydrous sodium sulfate and the ether was evaporated, the residue was distilled yielding 62.1 g., boiling point 155–163° at 0.03 mm. A small portion was crystallized from hexane; melting point 62–64°.

Preparation of 4-[2 - (N - nitrosophenylamino)ethyl] pyridine.—A solution of 22 g. of sodium nitrite was added dropwise to a stirred cool (10°, ice bath) solution of 61 g. of 4-[2-(phenylamino)ethyl]pyridine, 300 ml. of 1 N hydrochloric acid and 275 ml. of ethanol. After the addition, the reaction mixtures was stirred for 5 hours in the cold (5–10°). After standing overnight, the second phase did not crystallize and it was extracted from the reaction mixture with ether (3× 200 ml.). The ether extract was washed by extraction with water (4× 700 ml.), and dried over anhydrous sodium sulfate. Following filtration of the desiccant, the ether was evaporated yielding 68.1 g. of a light yellow oil.

Preparation of 4-[2-(N-aminophenylamino)ethyl]pyridine.—To a stirred solution of 68.1 g. of 4-[2-(N-nitrosophenylamino)ethyl]pyridine, 270 ml. of acetic acid and 68 ml. of water was added in small portions 75 g. of zinc dust. During the addition, the temperature was maintained between 5–10° by the use of an ice-salt bath. After the addition, the reaction mixture was stirred near 0° for 1 hour and then stirred for 1.5 hours between 35–40° C. Water (300 ml.) was added and the mixture was filtered. The filter cake was washed with water (3× 50 ml.). Ice (200 g.) was added to the combined filtrate and washings. The pH was adjusted to 11 with 6 N sodium hydroxide and the alkaline mixture was extracted with ether (3× 200 ml.). The ether solution was washed by extraction with water (4× 100 ml.) and dried over anhydrous sodium sulfate. Following filtration of the desiccant and evaporation of the solvent, the yield of product was 53.2 g.

Preparation of 1,3,4,5 - tetrahydro - 2 - methyl - 5 - [2-(4 - pyridyl)ethyl] - 2H - pyrido[4,3-b]indole dihydrochloride.—A stirred solution of 20 g. of 4-[2-(N-aminophenylamino)ethyl]pyridine, 100 ml. of benzene and 20 g. of 1-methylpiperidone-4 was heated to reflux. By the use of a Dean-Stark trap, 1.5 ml. of water was removed from the reaction after 16 hours under reflux. The solution was concentrated to a syrup under reduced pressure on a water bath and to the stirred residue 70 ml. of 6.1 N alcoholic hydrogen chloride was added in small portions (10 ml.). After the addition the reaction mixture was refluxed and stirred for 0.5 hr. Upon cooling the mixture was poured onto ice (300 g.) and the pH was made greater than 10 with 6 N sodium hydroxide. The alkaline mixture was extracted with ether (3× 200 ml.). The ether extract was washed by extraction with water (4× 100 ml.) and dried over anhydrous sodium sulfate. Following filtration of desiccant and evaporation of the ether, the residue was distilled under reduced pressure, yield 10.1 g. B.P. 199–212° at 0.25 mm. The distillate was dissolved in methanol and a slight excess of alcoholic hydrogen chloride was added, followed by several volumes of ethyl acetate. The precipitate was filtered and dried yielding 5.8 g., M.P. 243–244°. Upon recrystallization of the salt from a mixture of ethyl acetate and methanol the melting point became 247–248°, $$\lambda_{max.}^{isopropanol}\ 220\ m\mu,\ \epsilon,\ 35,400$$

*Analysis.*—Cal'd for $C_{19}H_{21}N_3 \cdot 2CHl$ (M.W. 364.31), percent: C, 62.64; H, 6.36; N, 11.54. Found (percent): C, 62.67; H, 6.57; N, 11.52.

Example 7

Preparation of 4-[2-(4-methylphenylamino)ethyl]pyridine.—A stirred mixture of 22 g. of p-toluidine, 200 ml. methanol, 21 g. of 4-vinylpyridine and 28 g. glacial acetic acid was heated and refluxed. After 7 hrs. under reflux, the reaction mixture was made alkaline with 6 N sodium hydroxide and steam distilled for 7 hrs. Ice was added to the pot residue and the mixture was extracted with ether (3× 200 ml.). The ether extract was washed by extraction with water (3× 200 ml.) and dried over anhydrous sodium sulfate. Following filtration of the desiccant and evaporation of the ether, the residue was distilled under reduced pressure to give 8.0 g., B.P. 159–161° at 0.65 mm.

Preparation of 4-[2-(4-methyl-N-nitrosophenylamino)ethyl]pyridine.—A solution of 3.4 g. of sodium nitrite was added dropwise to a cold (10°) stirred mixture of 8 g. of 4-[2-(4-methylphenylamino)ethyl]pyridine, 45 ml. of 1 N hydrochloric acid and 30 ml. of ethanol. After the addition the reaction mixture was stirred for 1.5 hr. with the temperature maintained between 5–10° by means of an ice bath. The reaction was then stirred for 3 hrs. at room temperature and filtered. Upon drying 8.2 g., M.P. 65–67° was obtained.

Preparation of 4-[2-(N-amino-4-methylphenylamino)ethyl]pyridine.—Over the course of 1.5 hrs. 14 g. of zinc dust was added in small portions to a stirred mixture of 8.2 g. of 4-[2-(4-methyl-N-nitrosophenylamino)ethyl]pyridine, 32 ml. of glacial acetic acid and 8 ml. of water. During the addition the reaction mixture was held between 5–10°. After the addition of the zinc the reaction mixture was stirred for 2 hrs. between 5–10° and then for 1 hr. between 40–45°. Water (300 ml.) was added and the mixture was filtered. The filter cake was washed with water (4× 50 ml.). Ice (200 g.) was added to the combined filtrate and washings and the pH was adjusted to 10 with 6 N sodium hydroxide. The alkaline mixture was extracted with ether (3× 100 ml.) and the ether solution was washed by extraction with water (3× 100 ml.). Following drying over anyhdrous sodium sulfate, the desiccant was filtered off and the either solution was evaporated to dryness under reduced pressure, yelding 7.8 g.

Preparation of 1,3,4,5-tetrahydro-2,8-dimethyl-5-[2-(4-pyridyl)ethyl]-2H-pyrido[4,3-b]indole dihydrochloride.—A stirred solution of 7.8 g. of 4-[2-(N-amino-4-methylphenylamino)ethyl]pyridine, 10 g. 1-methylpiperidone-4 and 50 ml. of benzene was heated to reflux. After 6 hrs. under reflux 0.4 ml. of water was removed from the reaction mixture by means of a Dean-Stark trap. The reaction mixture was concentrated to dryness under reduced pressure in a water bath. To the stirred residue was added in small portions 50 ml. of 6.1 N alcoholic hydrogen chloride. After the addition was completed the reaction mixture was refluxed an additional 0.5 hr., allowed to cool and poured onto ice (200 g.). Sodium hydroxide (6 N) was added until the pH was greater than 10 and the alkaline mixture was extracted with ether (3× 100 ml.). The ether solution was washed by extraction with water (3× 100 ml.) and dried over anhydrous sodium sulfate. Following filtration of the desiccant the ether solution was evaporated to dryness under reduced pressure. Upon crystallization of the residue from hexane 4.8 g., M.P. 111.5–113.0°, was obtained.

*Analysis.*—Calc'd for $C_{20}H_{23}N_3$ (M.W. 305.40), percent: C, 78.65; H, 7.59; N, 13.76. Found (percent): C, 78.98; H, 7.25; N, 13.97.

The base (4.4 g.) was dissolved in ethanol and a slight excess of alcoholic hydrogen chloride was added followed by several volumes of ether. The precipitate was filtered and dried yielding 4.7 g. After the salt had been humidified (saturated water vapor in a desiccator) and redried 4.6 g. M.P. 231–232°, was obtained $$\lambda_{max.}^{isopropanol}\ 223\text{–}4,\ m\mu,\ \epsilon\ 30{,}700$$

*Analysis.*—Calc'd for $C_{20}H_{23}N_3 \cdot 2HCl$ (M.W. 378.33), percent: C, 63.49; H, 6.66; N, 11.11. Found (percent): C, 63.47; H, 6.80; N, 11.00.

Example 8

Preparation of 4-[2-(4 - trifluoromethylphenylamino)ethyl]pyridine.—A stirred solution of 16.1 g. p-aminobenzotrifluoride, 50 ml. methanol, 6 g. glacial acetic acid and 11 g. 4-vinylpyridine was heated to reflux. After 18 hours under reflux, the reaction was concentrated under reduced pressure and the residue was partitioned between ether and dilute sodium bicarbonate solution. The ether solution was separated and extracted with water. Following drying over anhydrous sodium sulfate, the desiccant was filtered off and the ether evaporated, yielding 17.5 g. M.P. 62–68°. Upon crystallization from hexane, the melting point became 70–71.5°.

*Analysis.*—Calc'd for $C_{14}H_{13}F_3N_2$ (M.W. 266.26), percent: C, 63.15; H, 4.92; N, 10.52. Found (percent): C, 63.22; H, 4.88; N, 10.56.

Preparation of 4-[2-(N-nitroso-4-trifluoromethylphenylamino)-ethyl]pyridine.—A mixture of 12.5 g. of 4-[2-(4-trifluoromethylphenylamino)ethyl]pyridine, 50 ml. of 1 N hydrochloric acid and 50 ml. of ethanol was stirred at room temperature until solution was complete. The solution was cooled in an ice bath to 5° and to the stirred mixture 3.5 g. of sodium nitrite in 40 ml. of water was added dropwise over the course of 1.5 hours. The temperature during the addition was held near 5° C. After the addition the mixture was stirred for 4 hours at 0°, filtered and air dried, yielding 12.4 g. of a light yellow solid.

Preparation of 4-[2-(N-amino-4-trifluoromethylphenylamino)ethylpyridine.—Over the course of 1.5 hours, 20 g. of zinc dust was added in small portions to a stirred mixture of 12.4 g. of 4-[2-(N-nitroso-4-trifluoromethylphenylamino)ethyl]pyridine, 50 ml. of glacial acetic acid and 10 ml. of water. The temperature was held between 0° and 10° with an ice bath during the addition of zinc. After the addition, the stirred mixture was allowed to come to room temperature slowly (4 hours). Water (100 ml.) was added and the mixture was filtered. The filter cake was washed with 50 percent acetic acid (3× 50 ml.). Ice (300 g.) was added to the combined filtrate and washings and excess 6 N sodium hydroxide was added. The alkaline mixture was extracted with ether and the ether extract was washed by extraction with water. After drying over anhydrous sodium sulfate, the desiccant was filtered off and the ether was evaporated yielding 10.2 g., M.P. 86–88°.

Preparation of 8 - trifluoromethyl-1,3,4,5-tetrahydro-2-methyl-5-[2-(4-pyridyl)ethyl]2H-pyrido[4,3-b]indole hydrochloride.—A stirred solution of 10.2 g. of 4-[2-(N-amino - 4 - trifluoromethylphenylamino)ethyl]pyridine, 70 ml. of benzene and 10 g. of 1-methylpiperidone-4 was heated to reflux. After 5 hours under reflux, 0.6 ml. of water had been removed by means of a Dean-Stark trap and the reaction was concentrated under reduced pressure. To the stirred residue, 60 ml. of 7.6 N alcoholic hydrogen chloride was added. After the addition was completed, the mixture was refluxed and stirred for 1 hour, poured onto ice and made alkaline with 6 N sodium hydroxide. The alkaline mixture was extracted with ether and the ether extract was washed by extraction with water. After the ether solution had been dried over anhydrous sodium sulfate, the desiccant was filtered off and the ether was evaporated, yielding 3.9 g., M.P. 166–168°. Following recrystallization from ethyl acetate, the melting point became 168.5–169.5°;

$$\lambda_{max.}^{isopropanol}\ 228\ m\mu,\ \epsilon\ 40{,}600$$

*Analysis.*—Calc'd. for $C_{20}H_{20}F_3N_3$ (M.W. 359.38), percent: C, 66.84; H, 5.61; N, 11.69. Found (percent): C, 66.56; H, 5.55; N, 11.60.

The base (3.4 g.) was dissolved in ethanol and an excess of alcoholic hydrogen chloride was added, followed by several volumes of ether; yield 3.7 g., M.P. 206–207°.

*Analysis.*—Calc'd for $C_{20}H_{20}F_3N_3 \cdot 2HCl \cdot 0.5\ H_2O$ (M.W. 441.32), percent: C, 54.43; H, 5.25; N, 9.52. Found (percent): C, 54.12; H, 4.92; N, 9.28.

Example 9

Preparation of 4-[2-(2-methylphenylamino)ethyl]pyridine.—A stirred solution of 22 g. o-toluidine, 200 ml. of methanol, 21 g. 4-vinylpyridine and 28 g. of glacial acetic acid was heated to reflux. After 7 hours under reflux the reaction mixture was made alkaline with 6 N sodium hydroxide. The alkaline mixture was steam distilled for 7 hours. Upon cooling the pot residue was extracted with ether. The ether extract was washed with water and dried over anhydrous sodium sulfate. Upon filtration of the desiccant and evaporation of the ether 28.7 g. was obtained.

Preparation of 4[2-(N-nitroso-2-methylphenylamino)ethyl]pyridine.—A solution of 10 g. sodium nitrite in 50 ml. of water was added dropwise over the course of 1.5 hours to a stirred solution of 27 g. of 4-[2-(2-methylphenylamino)ethyl]pyridine, 140 ml. of 1 N hydrochloric acid and 100 ml. of ethanol. The temperature during the addition was held near 5° with an ice bath. After the addition was completed, the reaction mixture was stirred for 2 hours with the temperature between 5–10°. Upon standing overnight at room temperature a second phase separated which was extracted with ether. The ether extract was washed by extraction with water and dried over anhydrous sodium sulfate. Following filtration of the desiccant and evaporation of the ether solution 23 g. of yellow liquid was obtained.

Preparation of 4-[2-(N-amino-2-methylphenylamino)ethyl]pyridine.—Over the course of 1.5 hours, 30 g. of zinc dust was added in small portions to a cold stirred mixture of 24 g. of 4-[2-(N-nitroso - 2 - methylphenylamino)ethyl]pyridine, 80 ml. of glacial acetic acid and 24 ml. of water. During the addition the temperature was held near 5° with an ice-salt bath. Following the addition, the mixture was stirred between 3 to 10° for 1 hour, and then it was stirred for 1.5 hours between 35 to 40°. Water (200 ml.) was added to the reaction mixture and the mixture was filtered. The filter cake was washed with water (4× 50 ml.). Ice (300 g.) was added to the combined filtrate and washings and the pH was made 11 with 6 N sodium hydroxide. The alkaline mixture was extracted with ether (3× 200 ml.) and the ether extract was washed by extraction with water. After the ether solution had dried over anhydrous sodium sulfate, the desiccant was filtered off and the ether evaporated, yielding 20.7 g. of a viscous liquid.

Preparation of 1,3,4,5-tetrahydro-2,6-dimethyl-5-[2-(4-pyridyl)ethyl] - 2H-pyrido[4,3-b]indole dihydrochloride hemihydrate.—A stirred solution of 20 g. of 4-[2-(N-amino - 2 - methylphenylamino)ethyl]pyridine, 100 ml. benzene and 13 g. 1-methylpiperidone-4 was heated to reflux. After 5 hours under reflux, 1.7 ml. of water had been removed from the reaction with a Dean-Stark trap and the reaction mixture was concentrated under reduced pressure. To the stirred residue 80 ml. of 7.8 N alcoholic hydrogen chloride was added in small portions. After the addition was completed, the reaction mixture was stirred under reflux for 1 hour, cooled to room temperature and poured onto ice (200 g.). Excess 6 N sodium hydroxide was added. The alkaline mixture was extracted with ether and the ether extract was washed by extraction with water. After the ether solution had dried over anhydrous sodium sulfate, the desiccant was filtered off and the ether evaporated. A yield of 5.6 g., M.P. 142.5–144° was obtained after triturating the residue with ethyl acetate. Upon recrystallization from ethyl acetate the yield became 4.1 g. M.P. 144–145°.

$\lambda_{max.}^{isopropanol}$ 228 m$\mu$, $\epsilon$ 40,600

*Analysis.*—Calc'd for $C_{20}H_{23}N_3$ (M.W. 305.40), percent: C, 78.65; H, 7.59; N, 13.76. Found (percent): C, 78.40; H, 7.74; N, 13.46.

The base (4.0 g.) was dissolved in ethanol and an excess of alcoholic hydrogen chloride was added followed by several volumes of ether. Upon filtration and drying of the precipitate, 4.3 g. was obtained, M.P. 183–185°.

*Analysis.*—Calc'd for $C_{20}H_{23}N_3 \cdot 2HCl \cdot 0.5\ H_2O$ (M.W. 387.35), percent: C, 62.01; H, 6.77; N, 10.84. Found (percent): C, 61.83; H, 7.06; N, 10.60.

Example 10

Preparation of ethyl-4-[2-(4-pyridyl)ethylamino]benzoate hydrochloride.—A solution of 21 g. 4-vinylpyridine, 200 ml. of methanol, 33 g. of ethyl-p-aminobenzoate and 28 g. glacial acetic acid was heated to reflux. After 8 hours under reflux, the pH of the cooled reaction mixture was adjusted to 8 with aqueous sodium bicarbonate and the mixture was steam distilled for 5 hours. When the pot residue had cooled it was extracted with ether. The ether extract was washed by extraction with water and dried over anhydrous sodium sulfate. After the desiccant was filtered off and the ether evaporated, the residue was distilled under reduced pressure; yielding 27.2 g., B.P. 189 to 220° at 0.03 mm. The distillate was dissolved in ethanol and an excess of alcoholic hydrogen chloride was added followed by several volumes of ether. When the precipitate was filtered and dried 27.6 g. was obtained, M.P. 148–150°. Following recrystallization from a mixture of ethyl acetate and methanol, the yield became 21.2 g., M.P. 150–151°.

*Analysis.*—Calc'd for $C_{16}H_{18}N_2O_2 \cdot 2HCl$ (M.W. 343.25), percent: C, 55.98; H, 5.87; N, 8.16. Found (percent). C, 56.18; H, 6.06; N, 8.12.

Preparation of ethyl 4-{2-[N-nitroso(4-pyridyl)ethyl]amino}benzoate.—A solution of 5.5 g. of sodium nitrite in 50 ml. of water was added dropwise to a stirred cold (5°, ice bath) mixture of 10 g. of ethyl-4-[2-(4-pyridyl)ethylamino]benzoate, 35 ml. of 1 N hydrochloric acid and 35 ml. of ethanol. After the addition was completed, the mixture was stirred with the temperature allowed to rise from 6 to 25° in the course of 3 hours. Following filtration and air drying 9.9 g. M.P. 120–122° was obtained.

Preparation of ethyl 4-{2-[N-amino(4-pyridyl)ethyl]amino}benzoate.—Over the course of 1.5 hrs., 15 g. of zinc dust was added to a stirred mixture of 9.9 g. of 4-{2-[N-nitroso(4-pyridyl)ethyl]amino}benzoate, 40 ml. of glacial acetic acid and 10 ml. of water. With an ice-salt bath the temperature was held between −2° and 5° during the addition. Following the completion of the addition, the mixture was stirred (the temperature allowed to rise from 5° to 20° over the course of 3 hrs.) and then for 1 hr. at 45°. Water (200 ml.) was added and the mixture was filtered. The filter cake was washed several times with water and excess 6 N sodium hydroxide was added to the combined filtrate, washings and ice. The alkaline mixture was extracted with ether and the ether extract was washed by extraction with water. After drying over anhydrous sodium sulfate, the desiccant was filtered off and the ether evaporated, yielding 7.0 g. of a viscous oil.

Preparation of 1,3,4,5 - tetrahydro - 2-methyl-5-[2-(4-pyridyl)ethyl] - 2H-pyrido[4,3-b]indole-8-carboxylic acid ethyl ester dihydrochloride hemihydrate.—A stirred mixture of 7.0 g. of ethyl-4-{2-[N-amino(4-pyridyl)ethyl]amino}benzoate, 50 ml. of benzene and 4 g. of 1-methylpiperidone-4 was heated to reflux. After 20 hrs., under reflux, 0.3 ml. of water had been removed with a Dean-Stark trap and the reaction mixture was concentrated under reduced pressure. To the stirred residue 30 ml. of 7.5 N alcoholic hydrogen chloride was added in small portions (5 ml.). After addition was completed, the reaction mixture was stirred under reflux for 2 hrs., cooled to room temperature and poured onto ice (300 g.). Solid sodium carbonate was added until the pH was 9 and the mixture was extracted with ether (3× 200 ml.). The ether extract was washed by extraction with water. After drying the ether solution over anhydrous sodium sulfate, the desiccant was filtered off and the ether evaporated. Following crystallization from ethyl acetate, 3.2 g., M.P. 120–121.5° was obtained.

$\lambda_{max.}^{isopropanol}$ 249 m$\mu$, $\epsilon$ 56,000

*Analysis.*—Calc'd for $C_{22}H_{25}N_3O_2$ (M.W. 363.44), percent: C, 72.70; H, 6.93; N, 11.56. Found (percent): C, 72.42; H, 7.00; N, 11.45.

The base (3.1 g.) was dissolved in ethanol and an excess of alcoholic hydrogen chloride was added followed by several volumes of ether; yield 3.2 g., M.P. 170–172°. Following recrystallization from a mixture of ethanol and ethyl acetate the melting point remainder 170–172°.

*Analysis.*—Calc'd for $M_{22}H_{25}N_3 \cdot 2HCl \cdot 0.5\ H_2O$ (M.W. 445.40), percent C, 59.33; H, 6.34; N, 9.43. Found (percent): C, 59.71; H, 6.48; N, 9.82.

Example 11

Preparation of 1,3,4,5-tetrahydro - 2 - methyl-5-[2-(4-pyridyl)-ethyl] - 2H - pyrido[4,3-b]indole-8-carboxylic acid diydrochloride.—A stirred mixture of 5 g. of 8-carbethoxy-1,3,4,5 - tetrahydro - 2 - methyl-5-[2-(4-pyridyl)ethel]-2H-pyrido[4,3-b]indole, 25 ml. of ethanol and 25 ml. of 6H sodium hydroxide was heated to reflux temperature. After 3 hrs. under reflux the reaction mixture was concentrated to dryness under reduced pressure and the residue was dissolved in water (250 ml.). The solution was filtered and the filtrate was made acid with 6 N hydrochloric acid. The solution was again concentrated to dryness and the residue was leached with boiling ethanol (3× 300 ml.). Upon filtration of the combined extractions the filtrate was concentrated to 100 ml. and 100 ml. of ethyl acetate was added, yielding 4.3 g. of precipitate. Following recrystallization from a mixture of ethanol and ethyl acetate, 2.2 g. was obtained, M.P. 210–212°;

$\lambda_{max.}^{isopropanol}$ 241 m$\mu$, $\epsilon$ 41,000

Upon drying of a sample for 18 hrs. under vacuum, at 135° C., the melting point became 237–8°.

*Analysis.*—Calc'd for $C_{20}H_{21}N_3O_2 \cdot 2HCl$ (M.W. 408.33), percent: C, 58.86; H, 5.67; N, 10.29. Found (percent): C, 58.53; H, 5.77; N, 9.92.

Example 12

Preparation of 1,3,4,5 - tetrahydro-8-hydroxymethyl-2-methyl-5-[2-(4 - pyridyl)ethyl] - 2H - pyrido[4,3-b]indole.—Under an atmosphere of dry nitrogen, 6 g. of powdered 8-carbethoxy1,3,4,5 - tetrahydro-2-methyl-5-[2-(4-pyridyl)ethyl]-2H-pyrido[4,3-b]indole was cautiously added to a stirred cooled mixture of 5 g. of lithium aluminum hydride in 200 ml. of dry ether. After the addition was completed, the reaction mixture was stirred under reflux for 24 hrs. Upon cooling the reaction mixture in an ice bath, 40 ml. of water was added dropwise. After the water addition was completed, the mixture was stirred at room temperature for 3 hrs., and then filtered. The filter cake was suspended in chloroform (200 ml.), stirred vigorously and filtered. The last step was repeated 2 more times and the chloroform solution was dried over anhydrous sodium sulfate. Following filtration of the desiccant and evaporation of the chloroform, 3.1 g. was obtained. Upon recrystallization from ethyl acetate, the yield became 2.2 g., M.P. 154–155° (uncorr.).

$\lambda_{max.}^{isopropanol}$ 230 m$\mu$, $\epsilon$ 39,300

*Analysis.*—Calc'd for $C_{10}H_{23}N_3O$ (M.W. 321.40), percent: C, 74.74; H, 7.21; N, 13.07. Found (percent): C, 74.79; H, 7.38; N, 13.29.

Example 13

Preparation of 8-chloro-1,3,4,5 - tetrahydro-5-[2 - (4-pyridyl)ethyl]-2H-pyrido[4,3 - b]indole dihydrochloride hemihydrate.—A stirred mixture of 4.6 g. of 2-benzoyl-8-chloro-1,3,4,5-tetrahydro-5-[2-(4 - pyridyl)ethyl] - 2H-pyrido[4,3-b]indole, 50 ml. of ethanol and 50 ml. of 6 N sodium hydroxide was heated to reflux. After 6 hrs. under reflux the reaction mixture was concentrated under reduced pressure to ⅓ volume and the residue was partitioned between water and ether. The ether solution was separated and washed by extraction with water. After drying over anhydrous sodium sulfate, the desiccant was filtered off and the ether evaporated. The residue was triturated with ethyl acetate, yielding 1.8 g., M.P. 146–149°. Upon recrystallization from ethyl acetate, 1.4 g. was obtained, M.P. 152.6–153.5°.

$\lambda_{max.}^{isopropanol}$ 234–235 m$\mu$, $\epsilon$ 36,500

*Analysis.*—Calc'd for $C_{18}H_{18}ClN_3$ (M.W. 311.80), percent: C, 69.33; H, 5.82; N, 13.48. Found (percent): C, 69.39; H, 5.75; N, 13.68.

The base was dissolved in ethanol and an excess of alcoholic hydrogen chloride was added. The precipitate which formed was filtered and recrystallized from ethanol, M.P. 258–260°.

*Analysis.*—Calc'd for $C_{18}H_{18}ClN_3 \cdot 2HCl \cdot 0.5H_2O$ (M.W. 393.74) percent: C, 54.91; H, 5.38; N, 10.67. Found (percent): C, 55.04; H, 5.40; N, 10.33.

Example 14

Preparation of 2-benzoyl-8-chloro-1,3,4,5-tetrahydro-5 - [2 - (4-pyridyl)ethyl]-2H-pyrido[4,3-b]indole hydrochloride.—A stirred mixture of 9.1 g. 4-[2-(N-amino-4-chlorophenylamino)ethyl]-pyridine, 150 ml. of 0.25 N alcoholic hydrogen chloride and 7 g. of 1-benzoyl-piperidone-4 was heated to reflux. After 8 hrs. under reflux, the reaction mixture was allowed to cool and poured onto ice (200 g.). The pH was made 11 with 6 N sodium hydroxide and extracted with ether. The ether extract was washed by extraction with water and dried over anhydrous sodium sulfate. Following filtration of the desiccant and evaporation of the ether 9.7 g. was obtained. Upon crystallization from a mixture of ethyl acetate and hexane, the yield became 5.6 g., M.P. 129–131°.

*Analysis.*—Calc'd for $C_{25}H_{22}ClN_3O$ (M.W. 415.90) (percent): C, 72.19; H, 5.33; N, 10.10. Found (percent): C, 72.45; H, 5.40; N, 10.13.

The base obtained was dissolved in ethanol and excess ethanolic hydrogen chloride was added and the solution was concentrated under reduced pressure. The residue was crystallized from a solution of ethyl acetate and methanol, M.P. 237–238°.

$\lambda_{max.}^{isopropanol}$ 233 m$\mu$, $\epsilon$ 42,000

*Analysis.*—Calc'd for $C_{25}H_{22}ClN_3O \cdot HCl$ (M.W. 452.-83) percent: C, 66.27; H, 5.12; N, 9.29. Found (percen): C, 66.02; H, 5.04; N, 9.03.

Example 15

Preparation of 8-chloro-1,3,4,5-tetrahydro-2-(2-phenethyl) - 5 - [2-(4-pyridyl)ethyl]-2H-pyrido[4,3-b]indole dihydrochloride monohydrate.—A stirred solution of 12.5 g. of 4-[2 (N-amino-4-chlorophenylamino)ethyl] pyridine, 70 ml. of benzene and 10 g. of 1-(2-phenethyl) piperidone-4 was heated to reflux. After 7 hr. under reflux, 0.7 ml. of water had been removed from the reaction with a Dean-Stark trap and the reaction mixture was concentrated under reduced pressure. To the stirred residue, 50 ml. of 7.5 N alcoholic hydrogen chloride was added portionwise. After the addition was completed, the reaction mixture was refluxed and stirred for an additional 0.5 hr. and poured onto ice. Sodium hydroxide (6 N) was added until the pH was 11 and the alkaline mixture was extracted with ether. The ether extract was washed by extraction with water. After drying over

19 anhydrous sodium sulfate, the desiccant was filtered and the ether evaporated. The residue was dissolved in ethanol and an excess of alcoholic hydrogen chloride was added. Following 24 hrs. in the cold, the precipitate was filtered and dried. Yield 17.5 g., M.P. 185–187°. Upon recrystallization of the salt from ethanol 11.4 g. was obtained, M.P. 187–8°.

$\lambda_{max}^{isopropanol}$ 228–9 m$\mu$, $\epsilon$ 41,100

*Analysis.*—Calc'd for $C_{26}H_{26}ClN_3 \cdot 2HCl \cdot H_2O$ (M.W. 506.9) percent: C, 61.60; H, 5.97; N, 8.30. Found (percent): C, 61.75; H, 6.08; N, 8.44.

A small portion of the salt was made into the free base and crytsallized from hexane, M.P. 97–98°.

*Analysis.*—Calc'd for $C_{26}H_{26}ClN_3$ (M.W. 415.95) percent: C, 75.07; H, 6.30; N, 10.10. Found (percent): C, 75.13; H, 6.60; N, 10.37.

Example 16

Pharmaceutical formulations incorporating representative products of this invention were prepared as follows:

TABLET FORMULATION

| | Per tablet (mg.) |
|---|---|
| 8-chloro - 1,3,4,5 - tetrahydro - 2 - methyl-5-[2-(4-pyridyl)ethyl] - 2H - pyrido-[4,3-b]indole dihydrochloride dihydrates | 10.0 |
| Lactose | 129.0 |
| Corn starch | 50.0 |
| Pregelatinized corn starch | 8.0 |
| Calcium stearate | 3.0 |
| Total weight | 200.0 |

Procedure (1) 8-chloro-1,3,4,5-tetrahydro - 2 - methyl-5-[2-(4-pyridyl)ethyl]-2H-pyrido[4,3-b]indole dihydrochloride dihydrate, lactose, corn starch and pregelatinized corn starch were mixed in a suitable mixer.

(2) The mix was passed through a Fitzpatrick Comminuting Machine fitted with No. 1A screen and with knives forward.

(3) The mixture was returned to the mixer and moistened with water to a thick paste. The moist mass was passed through a No. 12 screen, and the moist granules were dried on paper lined trays at 110° F.

(4) The dried granules were returned to the mixer, and the calcium stearate was added and mixed well.

(5) The granules were compressed at a tablet weight of 200 mg. using standard concave punches having a diameter of 5/16″.

CAPSULE FORMULATION

| | Per capsule (mg.) |
|---|---|
| 8-chloro-1,3,4,5-tetrahydro - 2 - methyl - 5 - [2-(4-pyridyl)ethyl]-2H-pyrido-[4,3-b]indole dihydrochloride dihydrate | 25.5 |
| Lactose | 159.5 |
| Corn starch | 30.0 |
| Talc | 5.0 |
| Total net weight | 220.0 |

Procedure (1) 8-chloro - 1,3,4,5 - tetrahydro - 2 - methyl-5-[2-(4-pyridyl)ethyl] - 2H - pyrido[4,3-b]indole dihydrochloride dihydrate, lactose and corn starch were mixed in a suitable mixer.

(2) The mixture was passed through a Fitzpatrick Comminuting Machine using a No. 1A screen and knives forward.

(3) The mixture was returned to the mixer and the talc added. It was blended well and filled into No. 4 two-piece, hard gelatin capsules on a Parke-Davis capsulating machine. (Any similar type capsulating machine may be used.)

20

SUPPOSITORY FORMULATION

| | Per 1.3 gm. suppository (gm.) |
|---|---|
| 8-chloro - 1,3,4,5 - tetrahydro - 2 - methyl-5-[2-(4-pyridyl)ethyl] - 2H - pyrido-[4,3-b]indole dihychloride dihydrate | 0.025 |
| Wecobee M (produced by E. F. Drew Company, 522 5th Ave., New York 10, N.Y.) | 1.230 |
| Carnauba wax | 0.045 |

Procedure (1) The Wecobee M and the carnauba wax were melted in a suitable size glass lined container, mixed well and cooled to 45° C.

(2) 8-chloro-1,3,4,5-tetrahydro - 2 - methyl-5-[2-(4-pyridyl)ethyl]-2H-pyrido[4,3-b]indole dihydrochloride dihydrate, which had been reduced to a fine powder with no lumps, was stirred until completely and uniformly dispsersed.

(3) The mixture was poured into suppository molds to yield suppositories having an individual weight of 1.3 gms.

(4) The suppositories were cooled and removed from molds. They were then individually wrapped in wax paper for packaging.

PARENTERAL FORMULATION

| | Per ampul | |
|---|---|---|
| 8-chloro - 1,3,4,5 - tetrahydro - 2 - methyl-5-[2-(4-pyridyl)ethyl] - 2H - pyrido[4,3-b]indole dihydrochloride dihydrate | mg | 5.0 |
| Propylene glycol | cc | 0.4 |
| Benzyl alcohol (benzaldehyde free) | cc | 0.015 |
| Ethanol 95% U.S.P. | cc | 0.10 |
| Sodium benzoate | mg | 48.8 |
| Benzoac acid | mg | 1.2 |
| Water for injection q.s. 1.0 cc. | | |

Procedure (1) 50 grams of 8-chloro - 1,3,4,5 - tetrahydro-2-methyl-5-[2-(4-pyridyl)ethyl] - 2H - pyrido[4,3-b]indole dihydrochloride dihydrate were dissolved in 150 cc. of benzyl alcohol; 4,000 cc. of propylene glycol and 1,000 cc. of ethanol were added.

(2) The 12 grams of benzoic acid were dissolved in the above. The 488 grams of sodium benzoate dissolved in 3,000 cc. of Water for Injection were added. The solution was brought up to final volume of 10,000 cc. with Water for Injection.

(3) The solution was filtered through an O2 Selas candle, filled into suitable size ampoules, gassed with $N_2$ and sealed. It was then autoclaved at 10 p.s.i. for 30 minutes.

What is claimed is:

1. A compound of the formula

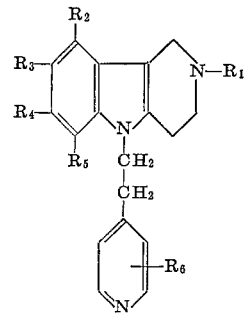

wherein $R_1$ is hydrogen, methyl, ethyl, benzoyl or phenyl lower alkyl; $R_2$, $R_3$, $R_4$ and $R_5$ are each independently hydrogen, halogen, lower alkyl, lower alkoxycarbonyl, carboxy, lower alkoxy, hydroxymethyl or trifluoromethyl; $R_6$ is hydrogen or lower alkyl.

and pharmaceutically acceptable acid addition salts thereof.

2. A compound in accordance with claim 1, wherein $R_2$, $R_5$ and $R_6$ are hydrogen.

3. A compound in accordance with claim 2, wherein $R_1$ is hydrogen.

4. A compound in accordance with claim 3, wherein $R_3$ is chloro and $R_4$ is hydrogen, i.e., 8 - chloro-1,3,4,5-tetrahydro - 5 - [2-(4-pyridyl)ethyl]-2H-pyrido[4,3-b]indole.

5. A compound in accordance with claim 2, wherein $R_1$ is methyl.

6. A compound in accordance with claim 5, wherein $R_3$ and $R_4$ are hydrogen, i.e., 1,3,4,5-tetrathydro-2-methyl-5-[2-(4-pyridyl)ethyl]-2H-pyrido[4,3-b]indole.

7. A compound in accordance with claim 5, wherein $R_3$ is methyl and $R_4$ is hydrogen, i.e., 1,3,4,5-tetrahydro-2,8 - dimethyl-5-[2 - (4-pyridyl)ethyl]-2H-pyrido[4,3-b]indole.

8. A compound in accordance with claim 5, wherein $R_3$ is trifluoromethyl and $R_4$ is hydrogen, i.e., 8-trifluoromethyl - 1,3,4,5 - tetrahydro - 2 - methyl-5-[2-(4-pyridyl)ethyl]2H-pyrido[4,3-b]indole.

9. A compound in accordance with claim 5, wherein $R_3$ is hydrogen and $R_4$ is chloro, i.e., 7-chloro-1,3,4,5-tetrahydro - 2 - methyl - 5 - [2 - (4-pyridyl)ethyl]-2H-pyrido[4,3-b]indole.

10. A compound in accordance with claim 5, wherein $R_3$ and $R_4$ are methyl, i.e., 1,3,4,5-tetrahydro-,2,7,8-trimethyl - 5 - [2 - (4-pyridyl)ethyl]-2H-pyrido[4,3-b]indole.

11. A compound in accordance with claim 5, wherein $R_3$ is hydrogen and $R_4$ is methyl, i.e., 1,3,4,5-tetrahydro-2,7-dimethyl - 5 - [2-(4-pyridyl)ethyl]-2H-pyrido-[4,3-b]indole.

12. A compound in accordance with claim 5, wherein $R_3$ is methoxy and $R_4$ is hydrogen, i.e., 1,3,4,5-tetrahydro-8-methoxy - 2 - methyl-5-[2-(4-pyridyl)ethyl]-2H-pyrido[4,3-b]indole.

13. A compound in accordance with claim 5, wherein $R_3$ is chloro and $R_4$ is hydrogen, i.e., 8-chloro-1,3,4,5-tetrahydro-2-methyl-5-[2-(4-pyridyl)ethyl] - 2H - pyrido[4,3-b]indole.

14. A compound in accordance with claim 5, wherein $R_3$ is ethoxycarbonyl and $R_4$ is hydrogen, i.e., 1,3,4,5-tetrahydro-2-methyl-5-[2-(4-pyridyl)ethyl] - 2H - pyrido[4,3-b]indole-8-carboxylic acid ethyl ester.

15. A compound in accordance with claim 5, wherein $R_3$ is carboxy and $R_4$ is hydrogen, i.e., 1,3,4,5-tetrahydro-2-methyl - 5 - [2 - (4-pyridyl)ethyl] 2H-pyrido[4,3-b]indole-8-carboxylic acid.

16. A compound in accordance with claim 5, wherein $R_3$ is hydroxy methyl and $R_4$ is hydrogen, i.e., 1,3,4,5-tetrahydro - 8 - hydroxymethyl-2-methyl-5-[2-(4-pyridyl)ethyl]-2H-pyrido[4,3-b]indole.

17. A compound in accordance with claim 1, wherein $R_4$, $R_5$ and $R_6$ are hydrogen and $R_1$ and $R_5$ are methyl, i.e., 1,3,4,5 - tetrahydro-2,8,9-trimethyl-5-[2-(4-pyridyl)ethyl]-2H-pyrido[4,3-b]indole.

18. A compound in accordance with claim 1, wherein $R_2$, $R_3$, $R_4$ and $R_6$ are hydrogen and $R_1$ and $R_5$ are methyl, i.e., 1,2,3,4,5 - tetrahydro - 2,6-dimethyl-5-[2-(4-pyridyl)ethyl]-2H-pyrido[4,3-b]indole.

19. A compound in accordance with claim 1, wherein $R_2$, $R_4$, $R_5$ and $R_6$ are hydrogen; $R_1$ is 2-phenethyl and $R_3$ is chloro, i.e., 8 - chloro-1,3,4,5-tetrahydro-2-(phenethyl)-5-[2-(4-pyridyl)ethyl]-2H-pyrido[4,3-b]indole.

20. A compound in accordance with claim 1, wherein $R_2$, $R_4$, $R_5$ and $R_6$ are hydrogen; $R_1$ is benzoyl and $R_3$ is chloro, i.e., 2 - benzoyl - 2 - chloro-1,3,4,5-tetrahydro-5-[2-(4-pyridyl)ethyl]-2H-pyrido[4,3-b]indole.

No references cited.

HENRY J. JILES, Primary Examiner

ALLAN L. ROTMAN, Assistant Examiner

U.S. Cl. X.R.

260—296; 424—263, 266

PO-1050
(5/69)

UNITED STATES PATENT OFFICE
CERTIFICATE OF CORRECTION

Patent No. 3,502,688      Dated March 24, 1970

Inventor(s) Berger and Corraz

It is certified that error appears in the above-identified patent and that said Letters Patent are hereby corrected as shown below:

Claim 6, Column 21, line 12 "tetrathydro" should be tetrahydro

Claim 17, Column 22, line 16 "$R_1$ and $R_5$ are methyl" should be $R_1$, $R_2$ and $R_3$ are methyl Claim 19, Column 22, line 25 "2-(phen-" should be 2-(2-phen- Claim 20, Column 22, line 29 "2-chloro" should be 8-chloro

SIGNED AND
SEALED
NOV 10 1970

(SEAL)
Attest:

Edward M. Fletcher, Jr.
Attesting Officer

WILLIAM E. SCHUYLER, JR.
Commissioner of Patents